United States Patent
Kimura et al.

(10) Patent No.: US 9,129,621 B1
(45) Date of Patent: Sep. 8, 2015

(54) MAMR HEAD WITH INCLINED MAMR HEAD BODY

(71) Applicant: HGST Netherlands B.V., Amsterdam (NL)

(72) Inventors: Hisashi Kimura, Kanagawa (JP); Kenji Sugiura, Odawara (JP); Yuta Udo, Odawara (JP); Katsuro Watanabe, Ota (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/620,557

(22) Filed: Feb. 12, 2015

(51) Int. Cl.
G11B 5/33 (2006.01)

(52) U.S. Cl.
CPC .......................................... *G11B 5/33* (2013.01)

(58) Field of Classification Search
CPC .......... G11B 5/147; G11B 5/187; G11B 5/23; G11B 5/33; G11B 5/31
USPC ............... 360/125.3, 125.31, 125.03, 125.09, 360/125.04, 125.17, 125.12, 125.16, 125.14
See application file for complete search history.

(56) References Cited

U.S. PATENT DOCUMENTS

| | | | |
|---|---|---|---|
| 4,191,980 A | | 3/1980 | King et al. |
| 5,939,624 A | * | 8/1999 | Smith, Jr. ........................ 73/105 |
| 6,112,401 A | * | 9/2000 | Smith, Jr. .................. 29/603.12 |
| 7,006,326 B2 | | 2/2006 | Okada et al. |
| 7,170,713 B2 | * | 1/2007 | Gider et al. ................... 360/128 |
| 7,212,379 B2 | | 5/2007 | Hsu et al. |
| 7,324,304 B1 | | 1/2008 | Benakli et al. |
| 7,777,988 B2 | | 8/2010 | Guan et al. |
| 8,125,732 B2 | | 2/2012 | Bai et al. |
| 8,339,739 B2 | * | 12/2012 | Balamane et al. ......... 360/125.3 |
| 8,634,163 B2 | * | 1/2014 | Tanabe et al. .............. 360/125.3 |
| 9,001,465 B1 | * | 4/2015 | Shimizu et al. ............ 360/125.3 |
| 2004/0027719 A1 | * | 2/2004 | Gider et al. ................... 360/128 |
| 2010/0155232 A1 | | 6/2010 | Pentek et al. |
| 2014/0177092 A1 | | 6/2014 | Katada et al. |
| 2015/0043106 A1 | * | 2/2015 | Yamada et al. .......... 360/123.05 |

\* cited by examiner

*Primary Examiner* — Allen T Cao
(74) *Attorney, Agent, or Firm* — Alleman Hall McCoy Russell & Tuttle LLP (57) ABSTRACT

A microwave-assisted recording head comprises a main pole configured to emit a recording magnetic field for affecting a magnetic medium, the main pole serving as a first electrode and having a front portion at an air bearing surface (ABS) and a rear portion extending from the front portion. A microwave oscillator is positioned on a trailing side surface of the main pole. The trailing-side surface of the main pole forms a flat plane along the front and rear portions and is inclined with respect to a leading side surface at the front portion. The head body is inclined at an acute angle to the ABS, such that an acute angle, between 10 and 30 degrees, is formed between the trailing side surface of the main pole and the ABS.

20 Claims, 11 Drawing Sheets

Trailing Side

Leading Side

MAMR HEAD WITH INCLINED MAMR HEAD BODY

BACKGROUND

The present invention relates to a magnetic recording head having a function for inducing magnetization reversal by applying a high-frequency magnetic field to a magnetic recording medium, and to a magnetic recording and reading device.

In order to achieve higher recording density for a magnetic head mounted in a hard disk device, it is necessary to narrow the write track pitch and bits. The surface area of the main pole at the air bearing surface decreases considerably as the recording density increases. The recording field becomes smaller as the main pole becomes narrower in this way in a conventional magnetic head, and above a certain recording density, it no longer becomes possible to achieve the recording field required for writing. To address this issue, a high-frequency magnetic field-assisted recording method (MAMR: microwave-assisted magnetic recording) has been proposed, in which a microwave oscillator (spin torque oscillator) is formed on or near the main pole, and a high-frequency magnetic field is applied to the recording medium in order to reduce the coercive force of the medium, and in this state, a recording field is applied to the medium in order to record data. In addition, a method has also been proposed in which the recording portion of the main pole is inclined with respect to the substrate surface, a microwave oscillator is disposed on the inclined surface, and the head field intensity is effectively increased.

When a microwave oscillator is formed on the main pole, a very accurate pattern needs to be formed for the shape of the oscillator. With conventional manufacturing methods, if the recording portion of the main pole is inclined with respect to the substrate surface, unevenness is produced in the wafer surface, and the inclined part on the trailing side of the main pole becomes concave with respect to the wafer surface. Thus, it becomes difficult to form a highly accurate pattern when the microwave oscillator pattern is formed. Particularly, when chemical mechanical polishing (CMP) is used in order to form the microwave oscillator, it is difficult to process the concave parts on the uneven wafer surface. Consequently, the microwave oscillator is preferably formed on a flat part.

SUMMARY

A microwave-assisted magnetic recording (MAMR) head is disclosed that comprises a MAMR head body having a main pole configured to emit a recording magnetic field for affecting a magnetic medium, and a microwave oscillator positioned on a trailing side surface of the main pole. The main pole serves as a first electrode and has a front portion, which is parallel to or forms part of an air bearing surface (ABS), and a rear portion extending from the front portion. The trailing side surface of the main pole forms a flat plane along the front and rear portions, and is inclined with respect to a leading side surface of the main pole at the front portion of the main pole. The MAMR head body inclines at an acute angle to the ABS, such that an acute angle is formed between the trailing side surface of the main pole and the ABS. The acute angle between the trailing side surface of the main pole and the ABS is between 10 and 30 degrees.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 2A-B show schematic diagrams of a MAMR magnetic recording head according to an exemplary embodiment of the present invention. FIG. 2A shows a partial cross-sectional side view through a middle section of the MAMR head, while

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1A:
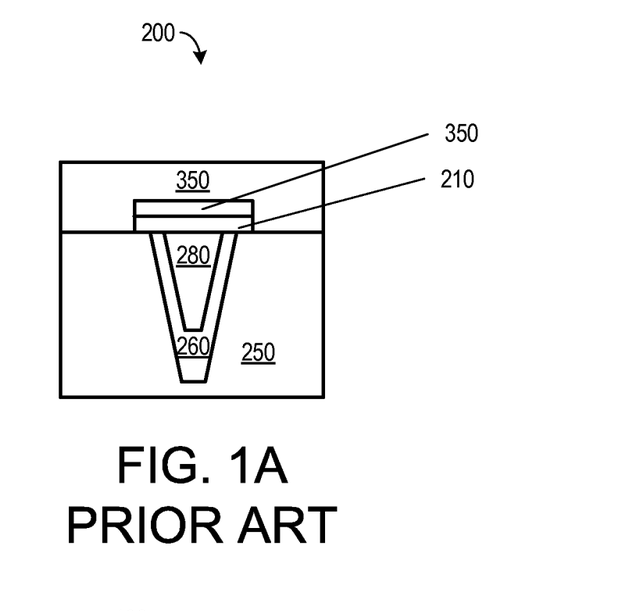
FIG. 1A is a schematic diagram of a conventional magnetic recording head.

Turning to FIG. 1A, a conventional magnetic recording head 200 is shown. The conventional magnetic recording head 200 comprises a main pole 280 adapted for producing a writing magnetic field, a trailing shield 350 positioned on a trailing side of the main pole 280, a trailing gap 210 positioned between the trailing shield 350 and the main pole 280, a side shield 250 positioned on at least the sides of the main pole 280 in a cross-track direction, and a side gap 260 positioned between the side shield 250 and the main pole 280.

Figure 1B:
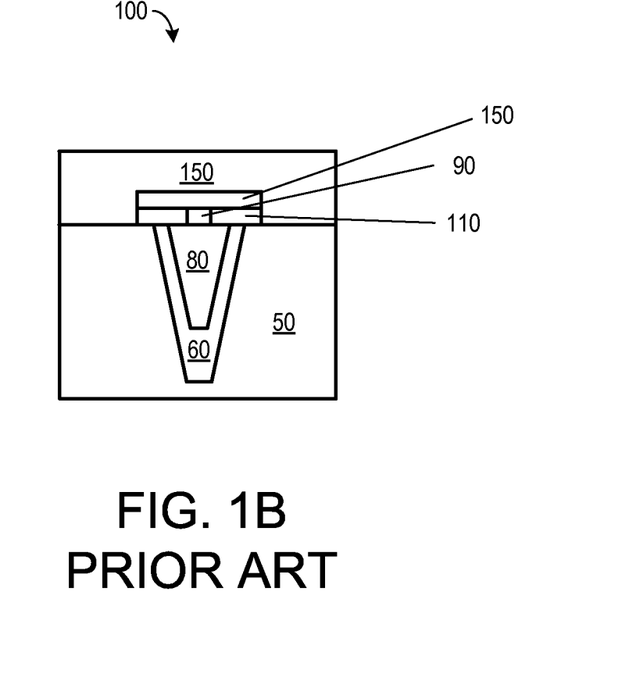
FIGS. 1B-C are schematic diagrams of a conventional MAMR magnetic recording head.
Figure 1C:
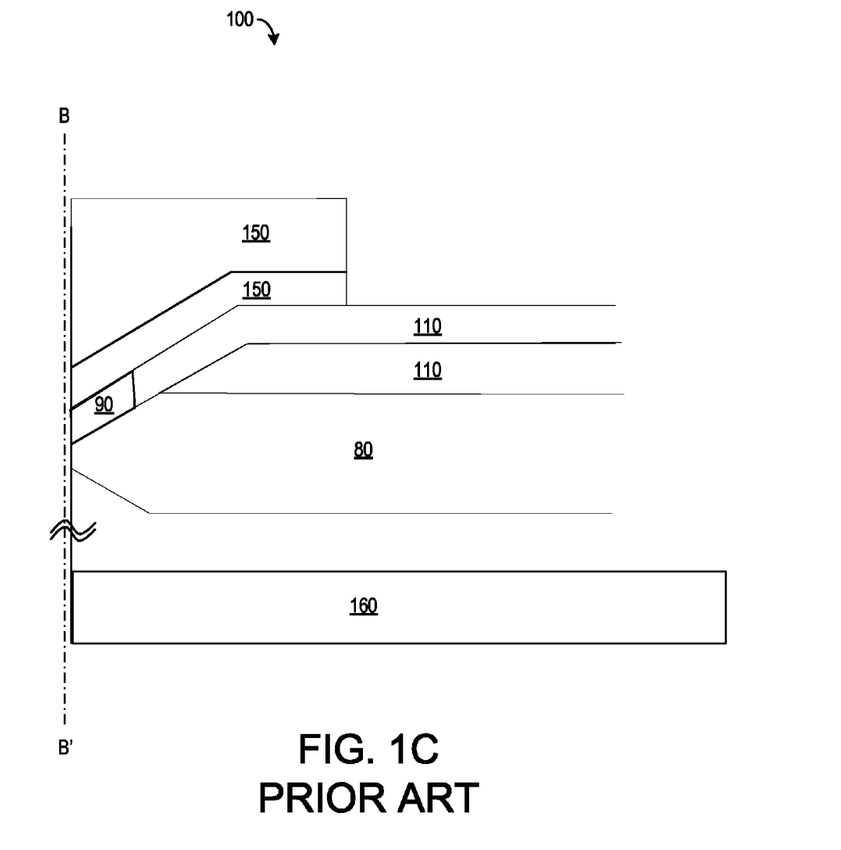

Turning to FIGS. 1B and 1C, a conventional MAMR magnetic recording head 100 is shown. Compared to the conventional magnetic recording head 200, the MAMR magnetic recording head 100 can be configured with narrower main poles and to write with a smaller recording field. The MAMR recording head 100 comprises a microwave oscillator 90 that is positioned on the main pole 80, a trailing gap 110 positioned on the sides of the microwave oscillator 90, a trailing shield 150 positioned on the trailing gap 110 and the microwave oscillator 90 on a trailing side of the main pole 80, a side shield 50 positioned on at least the sides of the main pole 80 in a cross-track direction and set on a substrate 160, and a side gap 60 positioned between the side shield 50 and the main pole 80. The main pole 80 is configured to emit a recording magnetic field for affecting a magnetic medium, the main pole 80 serving as a first electrode and having a front portion at an air bearing surface (ABS). The trailing shield 150 is a magnetic film serving as a second electrode, positioned over a trailing side surface of the main pole 80. A microwave oscillator 90 that is positioned on the main pole 80 reduces the coercive force of the medium, so that smaller recording fields can be used to record data. The side gap 60 is typically a non-magnetic film.

With conventional methods for manufacturing a MAMR magnetic recording head, the microwave oscillator 90 is formed on a trailing side surface of the main pole 80 that is inclined with respect to the substrate 160 and the ABS (B-B'). While the inclined orientation of the trailing side surface of the main pole with respect to the ABS improves head field intensity, the inclined surface also tends to become uneven with concave parts, compromising recording performance. Thus, conventional methods fail to provide an even, flat trailing side surface for an inclined part of the main pole on which a microwave oscillator is formed at an inclined orientation with respect to the ABS.

Figure 2A:
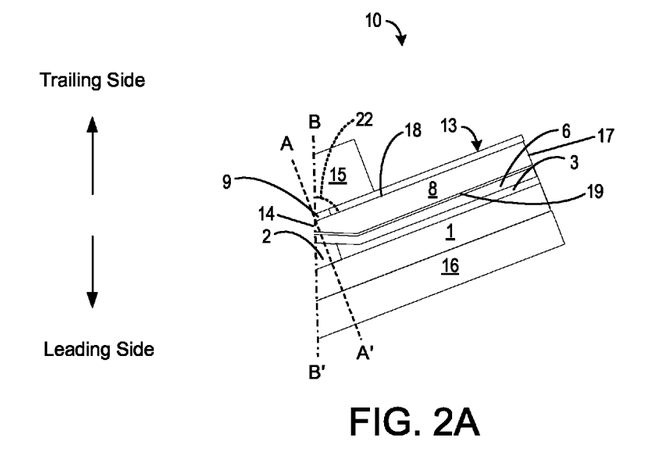
Figure 2B:
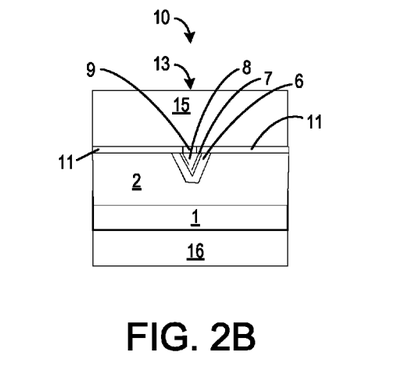
FIG. 2B shows a partial cross-sectional frontal view facing the air bearing surface of the MAMR head.

Turning to FIGS. 2A and 2B, a microwave-assisted magnetic recording (MAMR) head 10 is shown according to the exemplary embodiment of the present invention. FIG. 2A shows a partial cross-sectional side view through a middle section of the MAMR head, while FIG. 2B shows a partial cross-sectional frontal view facing the air bearing surface of the MAMR head. The MAMR head body 13 has a main pole 8 that is configured to emit a recording magnetic field for affecting a magnetic medium, the main pole 8 serving as a first electrode and having a front portion 14, which is parallel to or forms part of an air bearing surface (ABS) B-B', and a rear portion 17 extending from the front portion 14. The trailing side surface 18 of the main pole 8 forms a flat plane along the front 14 and rear portions 17, and is inclined with respect to the leading side surface 19 of the main pole 8 at the front portion 14 of the main pole 8. A second magnetic layer 15, which is a magnetic film functioning as a conductive layer, is positioned above the main pole 8, and the conductive layer serves as a second electrode. The MAMR head body 13 also has a microwave oscillator 9 that is positioned on a trailing side surface 18 of the main pole 8, between the second magnetic layer 15 and the main pole 8. The MAMR head body 13 inclines at an acute angle 22 to the ABS, such that an acute angle 22 is formed between the trailing side surface 18 of the main pole 8 and the ABS. The acute angle 22 between the trailing side surface 18 of the main pole 8 and the ABS is between 10 and 30 degrees. Both a leading side and a trailing side of the microwave oscillator 9 are configured to generate a high-frequency magnetic field which is superimposed with the recording magnetic field from the main pole 8 in order to record data to the magnetic medium, when current flows to the microwave oscillator 9 that is positioned between the first electrode and the second electrode. A non-magnetic film 6 is provided surrounding the main pole 8 to constitute a magnetic separation layer for the main pole 8 and a first magnetic layer 2. As shown in FIG. 2B, the first magnetic layer 2 (the side shield) is positioned on at least on the sides (right and left sides in the Figure) of the main pole 8 in a cross-track direction and set on a substrate 16. A layer of alumina 1 may be provided between the substrate 16 and the first magnetic layer 2. An insulating film 11, or a non-magnetic film functioning as a trailing gap, is formed on the sides of the microwave oscillation layer, which extends in a track width direction along the length of the front portion of the main pole.

Figure 3:
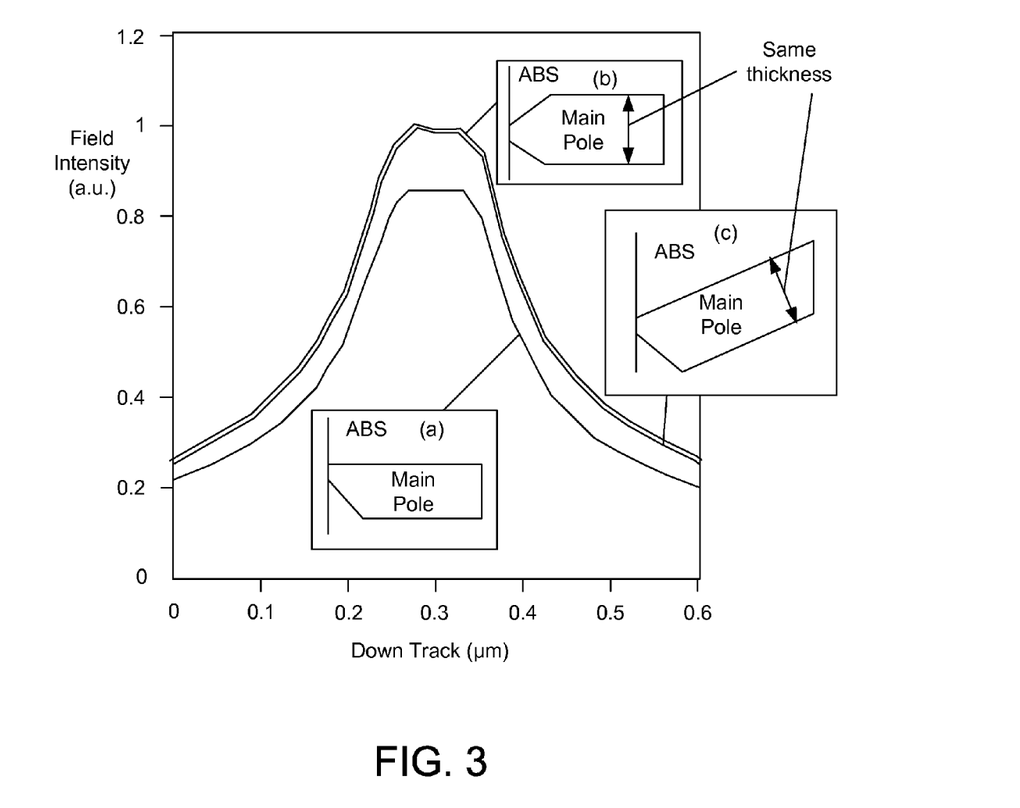
FIG. 3 shows the head field intensity of a magnetic head having a conventional structure and a magnetic head according to an embodiment of the present invention.

FIG. 3 shows the difference in head field distribution according to the head structure. FIG. 3 shows the head field distributions for the following structures: (a) a conventional structure in which there is no inclined part on the trailing side of the main pole; (b) a conventional structure in which an inclined part is provided on part of the trailing side of the main pole as shown in FIG. 1C; and (c) a structure according to the embodiment of FIGS. 2A-B according to which an inclined part is not formed on the trailing side of the main pole during the wafer formation process, but rather the MAMR head body is inclined with respect to the ABS during the slider formation process. As is clear from FIG. 3, it can be understood that the head field of a magnetic head having the conventional structure (b), in which an inclined part is provided on part of the trailing side of the main pole, is greater than structure (a), in which there is no inclined part on the trailing side of the main pole. Furthermore, it can be understood that a recording head having a conventional structure (b), in which an inclined part is provided on part of the trailing side of the main pole, and a recording head having a structure (c) according to the an embodiment of the present invention in which an inclined part is not formed on the trailing side of the main pole during the wafer formation process, but rather in which the MAMR head body is inclined with respect to the ABS during the slider formation process as in the embodiment of FIGS. 2A-B, have no significant difference in terms of the head field intensity, when controlled for the thickness of each structure. That is to say, it can be understood that a high field intensity can be obtained by inclining the MAMR head body with respect to the ABS during the slider formation process, without forming an inclined part on the trailing side of the main pole during the wafer formation process.

Figure 4A:
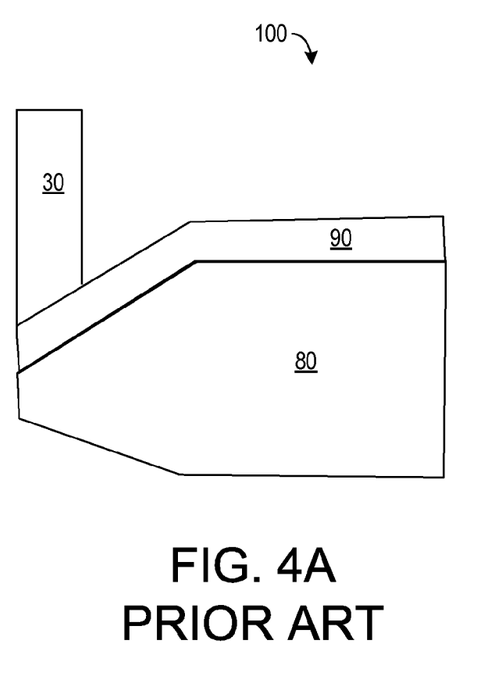
FIGS. 4A-B show the process for producing a MAMR head in accordance with a conventional structure.
Figure 4B:
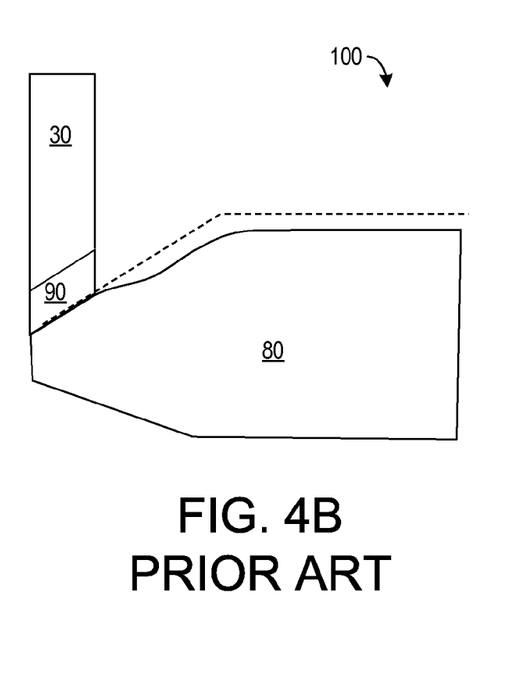
Figure 5A:
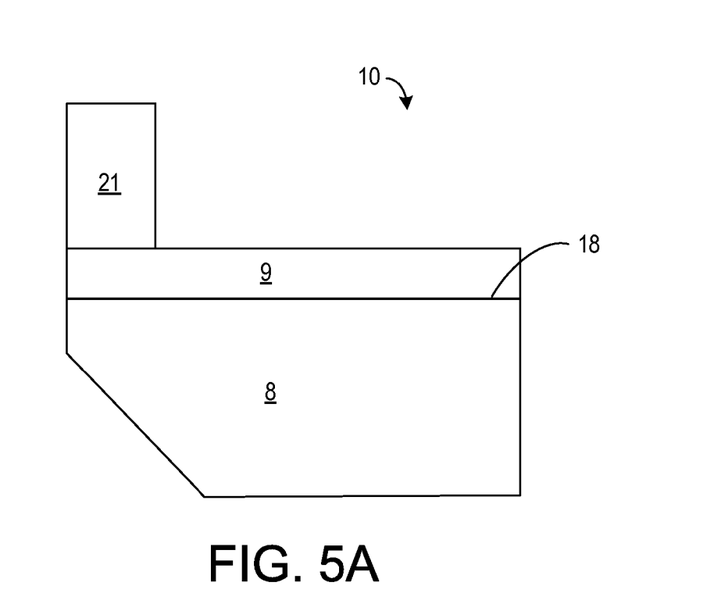
FIGS. 5A-C show an overview of the process for producing a MAMR head in accordance with an embodiment of present invention.
Figure 5B:
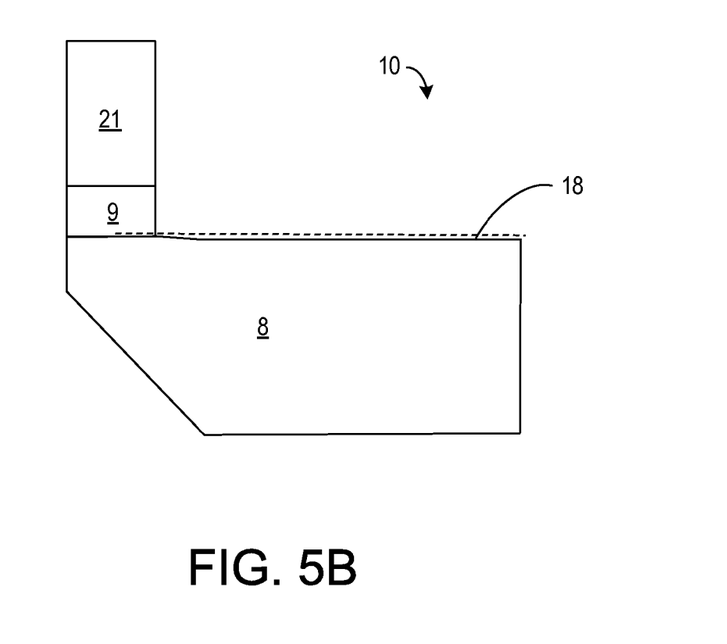

FIGS. 4A-B and FIGS. 5A-B show a comparison between the process of forming the conventional microwave oscillator 90 of FIG. 1C in which there is a taper on the recording part of the main pole 80 (FIGS. 4A-B), and the process of forming a microwave oscillator 9 of the recording head 10 of FIGS. 2A-B according to an embodiment of the present invention. According to the embodiment the MAMR head body 13 is inclined with respect to the ABS in the slider formation process, without forming an inclined part on the trailing side 18 of the main pole 8 during the wafer formation process (FIGS. 5A-B). As shown in FIG. 4A, in the conventional microwave oscillator process, a microwave oscillation layer 90 is formed over the whole surface on the trailing side of the main pole 80, and a resist 30 is formed in order to process the rear portion of the microwave oscillation layer 90. The side of the ABS on the left-hand side has been omitted in this Figure. In addition, as shown in FIG. 4B, processing is carried out by means of ion beam etching in order to remove part of the microwave oscillation layer 90, but the microwave oscillator 90 needs to be formed on the inclined part on the trailing side of the main pole 80, and at this position, the angle between the resist 30 and the main pole 80 is less than 90°. When this angle is less than 90°, etching performed by means of the ion beam is obstructed, and as a result, the etching rate at the front portion of the microwave oscillator 90 decreases. That is to say, there is a larger amount of etching on a flat part than on an inclined part, so there is a problem in that the main pole 80 is etched in order to remove the film at the front portion of the microwave oscillator 90, which is on the inclined part. When the main pole 80 is etched in this way, an uneven surface results, and it may not be possible to generate an adequate recording field with respect to the medium.

Figure 5C:
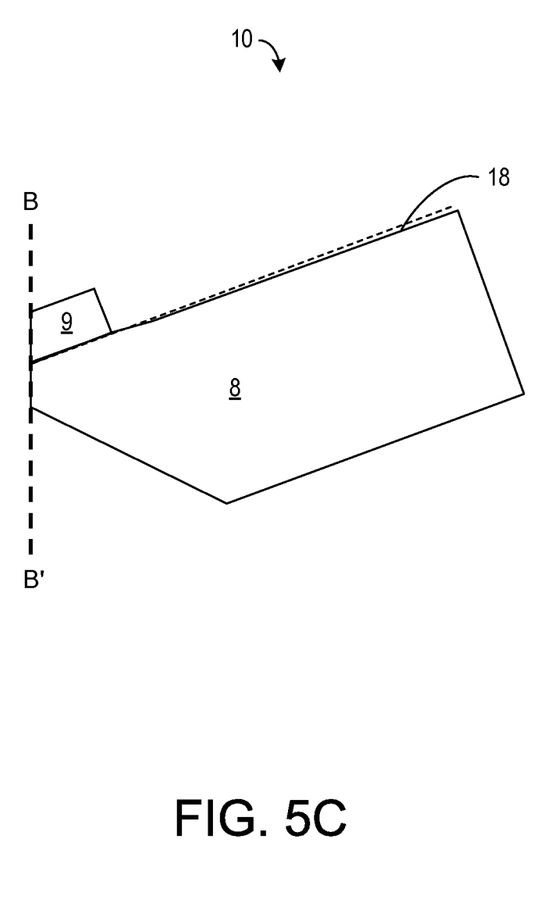

On the other hand, according to an embodiment of the present invention, as shown in FIG. 5A, it can be understood that a resist pattern 21 is formed perpendicularly with respect to a microwave oscillation layer 9, and the main pole 8 is not inclined at the front portion of the microwave oscillator 9 where the resist pattern 21 is formed. Next, as shown in FIG. 5B, when processing is carried out by means of ion beam etching in order to remove part of the microwave oscillation layer 9, the angle between the resist pattern 21 and the microwave oscillation layer 9 is 90°, so the ion beams are applied more evenly than in the case of a structure with a main pole 8 having an inclined part on the trailing side during the wafer formation process. Accordingly, the main pole 8 is etched by a smaller amount when the film at the front portion of the microwave oscillator 9 is removed, and consequently there is also a smaller reduction in the head field. Thus, when processing is carried out by means of ion beam etching in order to remove part of the microwave oscillation layer 9, the amount of etching of the main pole 8 can likewise be reduced in accordance with an embodiment of the present invention when the MAMR head 10 is formed. FIG. 5C shows a structure, according to an embodiment of the present invention, in which an inclined part is not formed on the trailing side of the main pole 8 during the wafer formation process, but rather in which the MAMR head body is inclined with respect to the ABS during the slider formation process.

Figure 6A:
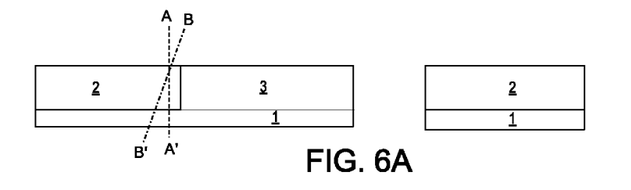
FIGS. 6A-N show the method for producing the MAMR magnetic recording head in accordance with the embodiment of FIGS. 5A-C.
Figure 6B:
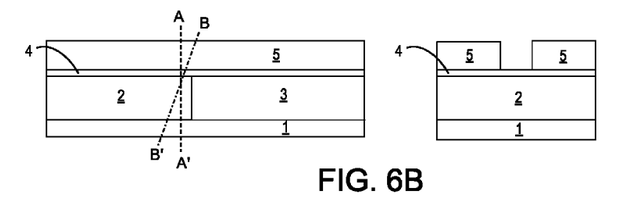
Figure 6C:
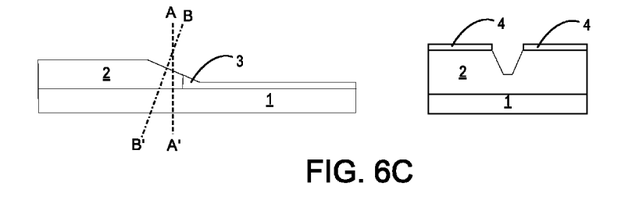
Figure 6D:
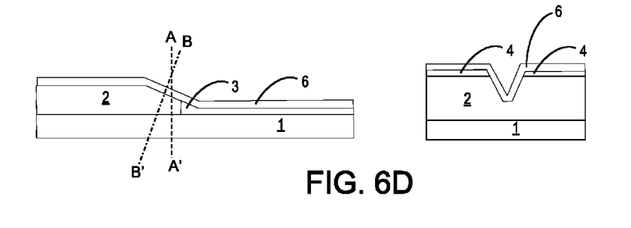
Figure 6E:
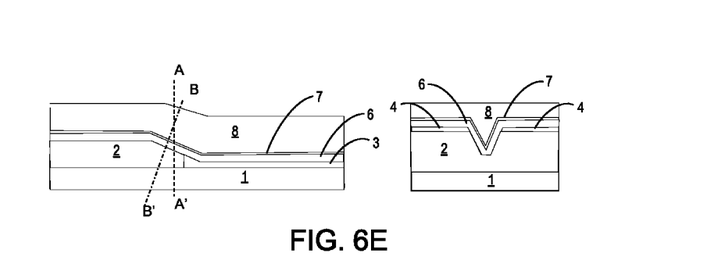
Figure 6F:
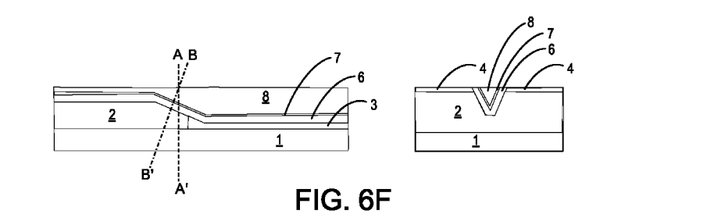
Figure 6G:
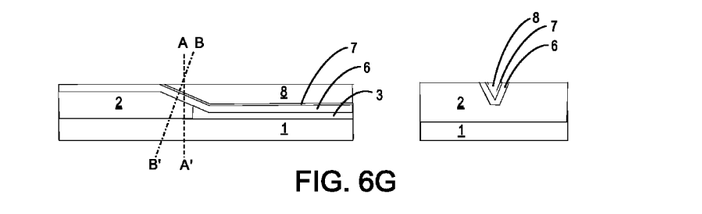
Figure 6H:
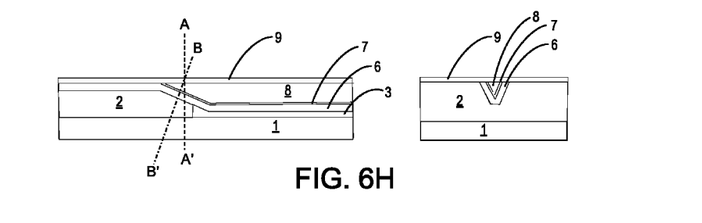
Figure 6I:
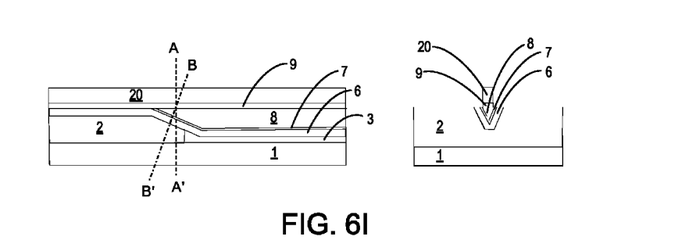
Figure 6J:
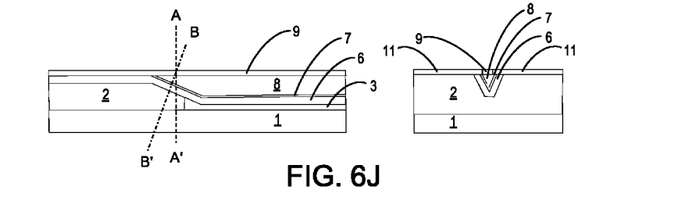
Figure 6K:
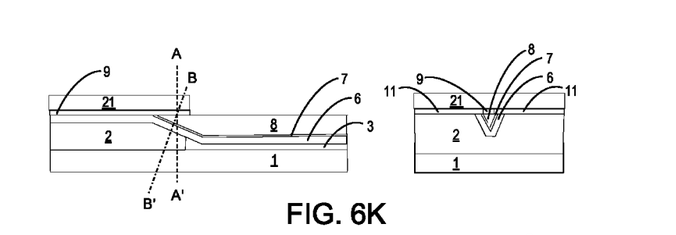
Figure 6L:
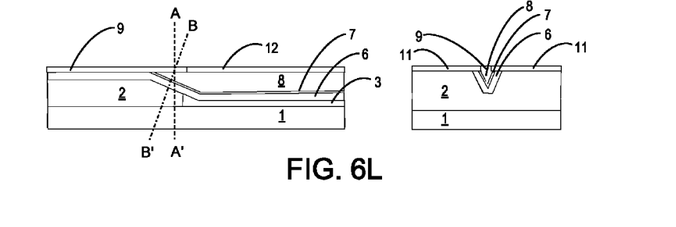
Figure 6M:
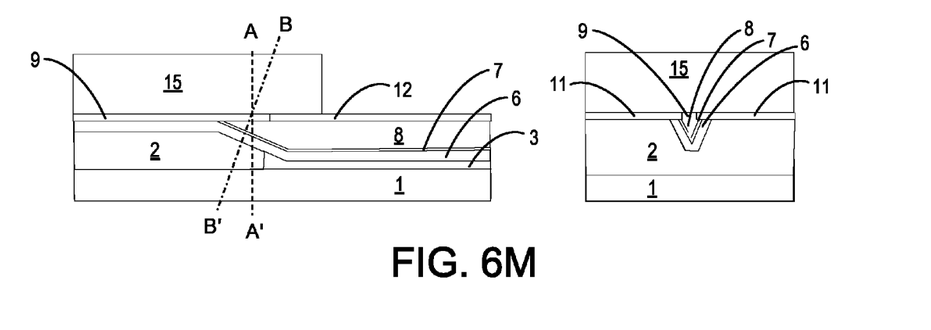
Figure 6N:
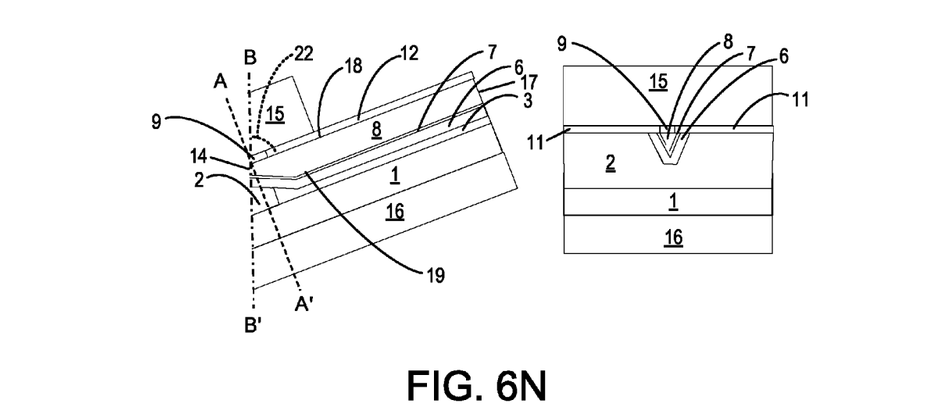

FIGS. 6A-N are views in cross section illustrating manufacturing steps of an example method for producing the MAMR head 10 of FIGS. 2A-B, in accordance with an embodiment of the present invention. The left-hand side view of the Figures shows a partial cross-sectional side view through a middle section of the MAMR head, while the right-hand side view shows a partial cross-sectional frontal view facing the air bearing surface of the MAMR head 10.

FIG. 6A shows the shape after a substrate is formed (for the sake of brevity, the substrate layer 16 is omitted in FIGS. 6A-M). A plating underlayer, such as alumina 1, is deposited over the substrate in order to separate a read head and a recording part, a first magnetic layer 2 (leading edge shield=LES) forming a shield on the leading side of the main pole is plated, an $Al_2O_3$ insulating film 3 is formed beside the first magnetic layer 2 and over the alumina 1, and CMP (chemical mechanical polishing) is then carried out in order to planarize the shape. It should be noted that the portion to the left of the plane A-A' would be removed in the conventional slider formation process after the wafer formation process, and the portion to the left of the plane B-B' is removed in the slider formation process of the present embodiment of the present invention. Here, the first magnetic layer 2 is formed perpendicular to the substrate surface (not shown in FIGS. 6A-M), on which the alumina 1 is deposited, but the process may be set in such a way that the first magnetic layer 2 is formed at an inclination beforehand, so that it would be oriented perpendicularly after the slider formation process, to take into account the inclination of the eventual ABS (B-B').

FIG. 6B shows the situation when a multilayer film 4 comprising a hard mask layer for the subsequent reactive ion etching (RIE) process and a CMP stopper layer is formed over the first magnetic layer 2 and the $Al_2O_3$ insulating film 3, and then a resist pattern 5 is patterned using a mask in order to obtain the required planar surface. Here, an alloy comprising Ni, Cr or the like may be used as the RIE stopper at the trailing part of the multilayer film 4, and DLC or Ta etc. may be used as the CMP stopper in the leading layer thereof.

FIG. 6C shows the situation when the multilayer film 4 is etched using a resist pattern 5 as a mask layer, the resist pattern 5 is removed, and then the multilayer film 4 is used as a mask for etching the first magnetic layer 2 by means of RIE. Here, Ar ion milling is used for etching the multilayer film 4, but RIE employing $CF_4$ or $CHF_3$, etc., may be used for etching the leading side of the multilayer film 4 when the non-etching material is Ta. Furthermore, when the non-etching material is diamond-like carbon (DLC), RIE employing $O_2$ or $CO_2$, etc., may be used. Furthermore, RIE comprising methanol or ammonia etc. is used for etching the first magnetic layer 2 with the multilayer film 4 as a mask. A non-magnetic film 6 is then deposited over the first magnetic layer 2, the insulating film 3, and the multilayer film layer 4. For illustration purposes, the multilayer film layer 4 is omitted in the partial cross-sectional side view through a middle section of the MAMR head.

FIG. 6D shows the situation after the deposition of a non-magnetic film 6 constituting a magnetic separation layer for the main pole and a first magnetic layer 2 in a trench previously formed. Here, a film thickness of 0.5-2.0 times the main pole width is selected for the thickness of the non-magnetic film 6. In this case, a non-magnetic insulating film such as $Al_2O_3$, or a non-magnetic metallic film such as Ru may be used as the material of the non-magnetic film 6, which insulates the main pole from the first magnetic layer 2. A plating underlayer film 7 and plating layer 8 are then deposited over the non-magnetic film 6.

FIG. 6E shows the situation after deposition of a plating underlayer film 7 in the trench, and deposition of a plating layer 8 constituting the main pole. Here, the plating layer 8 may be formed by plating the whole surface of a plating underlayer film 7, or a resist pattern may be formed on a plating underlayer film 7, after which partial plating is provided. Furthermore, a material which produces a high saturation magnetic flux density is used for the plating layer 8 forming the main pole and the plating underlayer film 7 in order to achieve high recording performance, and in this instance, CoFeNi, CoFe or FeNi or the like is preferred.

FIG. 6F shows the situation when the main pole 8 has been planarized by chemical mechanical polishing (CMP) using the multilayer film 4 as a stopper layer. As shown in the Figure, the plating layer 8 on the multilayer film 4 is removed.

FIG. 6G shows the situation when the main pole 8 has been etched using Ar ion milling in order to form the main pole to a predetermined dimension after planarization. Here, the multilayer film 4 is also etched and removed at the same time the main pole 8 is etched. In addition, the first magnetic layer 2 is also etched to substantially the same height as the main pole 8, i.e., to the same height within a predetermined manufacturing tolerance. However, when DLC or the like is used in the multilayer film 4, the DLC film may be removed prior to this by $O_2$ ashing, after which Ar ion milling may be performed.

In FIG. 6H, the main pole is planarized, after which a microwave oscillation layer 9 is formed over the whole surface: the non-magnetic film 6, the first magnetic layer 2, and the main pole 8. The main pole 8 applies not only a recording field to the medium, but also functions as an electrode for providing a current to the microwave oscillation layer 9. Furthermore, it is clear from the left and right figures that the trailing side of the microwave oscillation layer 9 is level.

FIG. 6I shows the situation when a resist pattern 20 is deposited over the microwave oscillation layer 9, and the front portion of the microwave oscillation layer 9 has been etched in the track width direction by means of Ar ion milling using a resist pattern 20 as a mask. As shown in the Figure, there is no unevenness on the trailing side of the microwave oscillation layer 9, so the resist pattern 20 can be coated to a uniform thickness and, as a result, it is possible to improve the production yield.

FIG. 6J shows the situation when the front portion of the microwave oscillation layer 9 has been etched in the track width direction, an insulating film 11 has been formed on both sides of the microwave oscillation layer 9, and CMP has been carried out to remove the resist pattern 20. By forming an insulating film 11 on both sides of the microwave oscillation layer 9 in this way, it is possible for a current supplied from the main pole 8 to flow selectively to the microwave oscillation layer 9. Furthermore, there is no inclined part on the trailing side of the main pole in this process, so CMP can be performed relatively easily. It should be noted that a CMP stopper layer may also be provided on the trailing side of the microwave oscillation layer 9 or the insulating film 11, although this is not depicted.

FIG. 6K shows the situation when a resist pattern 21 has been deposited over the front portion of the microwave oscillation layer, and the rear portion of the microwave oscillation layer 9 has been etched in the height direction by means of Ar ion milling using a resist pattern 21 as a mask. In the same way as in FIG. 6I, there is no unevenness on the trailing side of the microwave oscillation layer 9, so the resist pattern 21 can be coated to a uniform thickness and, as a result, it is possible to improve the production yield.

FIG. 6L shows the situation when an insulating film 12 has been formed on the main pole 8 in the height direction, and CMP has been performed to remove the resist pattern 21. Furthermore, in the same way as in FIG. 6J, there is no inclined part on the trailing side of the main pole, so CMP can be performed relatively easily. It should be noted that a CMP stopper layer may also be provided on the trailing side of the microwave oscillation layer 9 or the insulating film 12, although this is not depicted.

FIG. 6M shows the situation when the microwave oscillator has been formed, after which a second magnetic layer 15 is plated over the microwave oscillation layer 9 and the insulating film 11. Here, the second magnetic layer 15 functions not only as a trailing shield for applying a recording field to the medium, but also functions as an electrode for providing current to the microwave oscillation layer 9. It should be noted that, in this Figure, the first magnetic layer 2 and the second magnetic layer 15 are separated by the insulating film 11, but it is equally possible for the insulating film to be removed in a region extending in the track width direction from the microwave oscillation layer 9 and for the first magnetic layer 2 and the second magnetic layer 15 to be electrically connected. However, care should be taken during manufacture such that current flows efficiently to the microwave oscillation layer 9 and such that the connection between the first magnetic layer 2 and the second magnetic layer 15 does not form a parallel circuit with the microwave oscillation layer 9. Moreover, the plating underlayer film 7 or part of the second magnetic layer 15 may be made of a material having high magnetic flux density.

FIG. 6N shows the situation after the microwave oscillator 9 and recording element formation process, when the ABS (B-B') is formed to be inclined at an acute angle 22 with respect to the trailing side surface 18 of the main pole 8 in the slider formation process. Here, a substrate 16 is present at the plating underlayer of the recording element, although this is not shown in FIGS. 6A-M, and the read element may be present between the recording element and the substrate 16. Furthermore, a coil for inducing magnetic flux and an electrode or the like for providing current to the coil are connected to the main pole 8 or second magnetic layer 15, although these elements are not depicted.

The above described embodiments provide a magnetic head in which a magnetic recording head having a taper on the front portion and enabling stable high-frequency magnetic field-assisted recording is formed with a good production yield. To achieve this, the magnetic head is provided with a taper on the front portion at the tip end of the recording pole, without an inclined surface being provided on the write portion on the trailing side of the main pole during the wafer formation process, so that a flat part can be provided to form the microwave oscillator.

It will be understood that the configurations and/or approaches described herein are exemplary in nature, and that these specific embodiments or examples are not to be considered in a limiting sense, because numerous variations are possible. The specific methods described herein include processes illustrated and/or described that may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A microwave-assisted magnetic recording (MAMR) head comprising:
   a MAMR head body having a main pole configured to emit a recording magnetic field, and a microwave oscillator positioned on a trailing side surface of the main pole, the main pole serving as a first electrode and having a front portion which is parallel to or forms part of an air bearing surface (ABS), and a rear portion extending from the front portion,
   wherein the trailing side surface of the main pole forms a flat plane along the front and rear portions,
   wherein the trailing side surface of the main pole is inclined with respect to a leading side surface of the main pole at the front portion of the main pole, and
   wherein the MAMR head body inclines at an acute angle to the ABS, such that an acute angle is formed between the trailing side surface of the main pole and the ABS.

2. The MAMR head of claim 1,
   wherein the acute angle between the trailing side surface of the main pole and the ABS is between 10 and 30 degrees.

3. The MAMR head of claim 1, wherein
   both a leading side and a trailing side of the microwave oscillator are configured to generate a high-frequency magnetic field, when current flows to the microwave oscillator positioned between the first electrode and a second electrode.

4. The MAMR head of claim 1, wherein
   the main pole comprises a material selected from a group consisting of CoFeNi, CoFe, and FeNi.

5. The MAMR head of claim 1, wherein
   the microwave oscillation layer extends in a track width direction along a length of the front portion of the main pole, and
   an insulating film is formed on both sides of the microwave oscillation layer in the track width direction.

6. The MAMR head of claim 1, wherein
   a non-magnetic film is provided surrounding the main pole, and is configured to insulate the main pole.

7. The MAMR head of claim 6, wherein
   the non-magnetic film has a thickness that is 0.5-2.0 times a width of the main pole.

8. The MAMR head of claim 6, wherein
   the non-magnetic film comprises a material selected from a group consisting of $Al_2O_3$ and Ru.

9. A hard disk drive comprising the MAMR head of claim 1.

10. A microwave-assisted magnetic recording (MAMR) head comprising:

a MAMR head body having a main pole configured to emit a recording magnetic field, and a microwave oscillator positioned on a trailing side surface of the main pole, the main pole serving as an electrode and having a front portion which is parallel to or forms part of an air bearing surface (ABS), wherein the MAMR head body inclines at an acute angle to the ABS, such that an acute angle is formed between a trailing side surface of the MAMR head body and the ABS.

11. A method of making a microwave-assisted magnetic recording (MAMR) head, comprising:
  forming a substrate;
  depositing alumina over the substrate;
  forming a first magnetic layer over the alumina;
  forming an $Al_2O_3$ insulating film beside the first magnetic layer and over the alumina;
  depositing a multilayer film comprising a hard mask layer, a stopper layer, and a first resist pattern over the first magnetic layer and the $Al_2O_3$ insulating film;
  reactive ion etching the multilayer film;
  removing the first resist pattern over the first magnetic layer and the $Al_2O_3$ insulating film;
  reactive ion etching the first magnetic layer, using the multilayer film as a mask;
  depositing a non-magnetic film over the first magnetic layer, the insulating film, and the hard mask layer;
  depositing over the non-magnetic film a plating underlayer film and plating layer to constitute a main pole;
  removing the plating layer on the multilayer film;
  etching and removing the multilayer film and, at the same time, etching the main pole;
  etching the first magnetic layer;
  depositing a microwave oscillation layer over the non-magnetic film, the first magnetic layer, and the main pole;
  depositing a second resist pattern over the microwave oscillation layer;
  etching a front portion of the microwave oscillation layer in a track width direction;
  forming an insulating film on both sides of the microwave oscillation layer;
  removing the second resist pattern;
  depositing a third resist pattern over the front portion of the microwave oscillation layer;
  etching a rear portion of the microwave oscillation layer in a height direction;
  forming an insulating film on the main pole in the height direction;
  removing the third resist pattern;
  plating a second magnetic layer over the microwave oscillation layer and the insulating film; and
  forming an air bearing surface (ABS) that is inclined at an acute angle with respect to a trailing side surface of the main pole.

12. The method of claim 11, wherein the stopper layer comprises DLC or Ta.

13. The method of claim 11, wherein the hard mask layer is etched with Ar ion milling.

14. The method of claim 12, wherein the stopper layer comprising Ta is etched with RIE employing $CF_4$ or $CHF_3$.

15. The method of claim 12, wherein the stopper layer comprising diamond-like carbon is etched with RIE employing $O_2$ or $CO_2$.

16. The method of claim 11, wherein the first magnetic layer is etched with reactive-ion etching employing methanol or ammonia.

17. The method of claim 12, wherein the stopper layer comprising diamond-like carbon is removed by means of $O_2$ ashing.

18. The method of claim 11, wherein the insulating film is removed from both sides of the microwave oscillation layer in a region extending in the track width direction from the microwave oscillation layer.

19. The method of claim 11, wherein the first magnetic layer and the second magnetic layer are electrically connected.

20. A method of making a microwave-assisted magnetic recording (MAMR) head, comprising:
  forming a MAMR head body having a main pole configured to emit a recording field, the main pole serving as an electrode and having a front portion which is parallel to or forms part of an air bearing surface (ABS);
  forming a microwave oscillator positioned on a trailing side surface of the main pole; and
  inclining the MAMR head body at an acute angle to the ABS, such that an acute angle is formed between a trailing side surface of the MAMR head body and the ABS.

* * * * *